V. P. BUCK, DEC'D.
T. L. BUCK, ADMINISTRATRIX.
SEAT.
APPLICATION FILED NOV. 1, 1911.
1,239,253.
Patented Sept. 4, 1917.
2 SHEETS—SHEET 1.
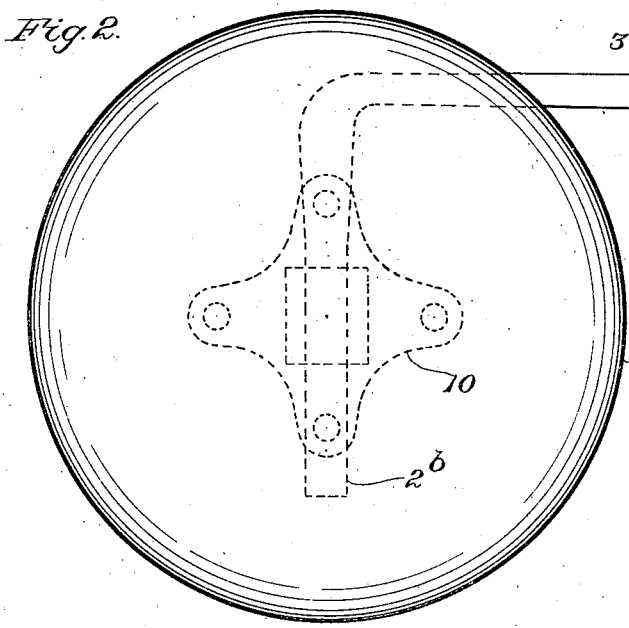
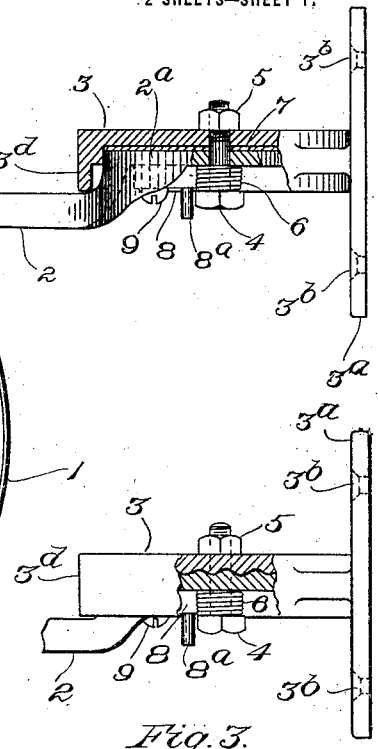
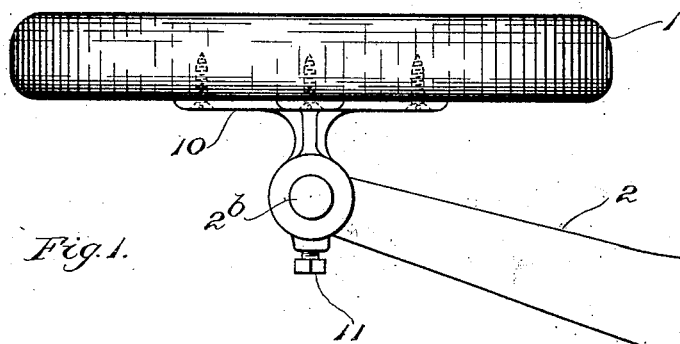
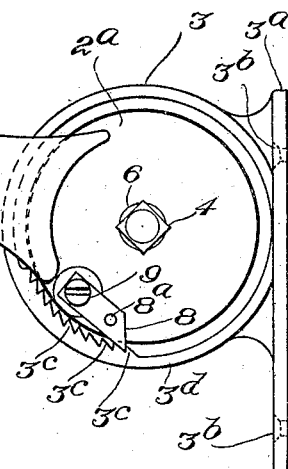
Witnesses:
Oscar F. Hill
Aaron F. Randall
Inventor:
Vertrude P. Buck
by Chas. F. Randall
Attorney.

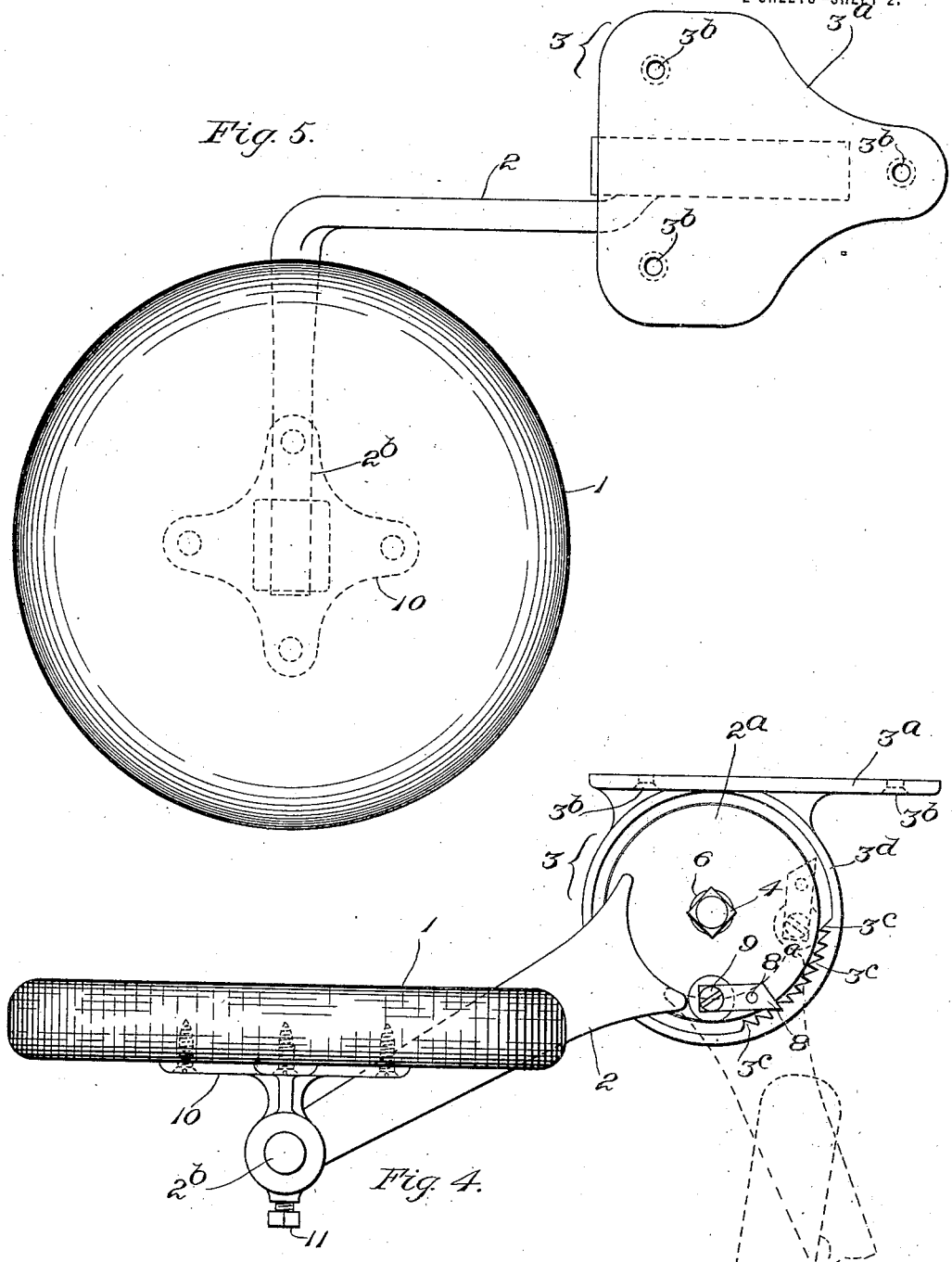

UNITED STATES PATENT OFFICE.

VERTRUDE P. BUCK, OF BOSTON, MASSACHUSETTS, ASSIGNOR OF ONE-HALF TO MARTIN A. HAYWARD, OF EAST BRIDGEWATER MASSACHUSETTS; THERESA L. BUCK, ADMINISTRATRIX OF SAID VERTRUDE P. BUCK, DECEASED.

SEAT.

1,239,253.      Specification of Letters Patent.      Patented Sept. 4, 1917.

Application filed November 1, 1911. Serial No. 657,946.

*To all whom it may concern:*

Be it known that I, VERTRUDE P. BUCK, a citizen of the United States, residing at Boston, in the county of Suffolk, State of Massachusetts, have invented a certain new and useful Improvement in Seats, of which the following is a specification, reference being had therein to the accompanying drawings.

The invention comprises various improvements in seats of the class adapted to be turned or swung into either a position for use or a position turned out of the way. The invention provides a seat which, when not in immediate use, may be swung by movement in a vertical plane into a retracted idle position, and in which latter position it is retained by the coaction of surfaces which are pressed together with yielding force.

The invention is illustrated in the drawings, in which latter,—

Figure 1 is a side elevation of one embodiment of the different features of the invention, showing one manner in which the same may be applied and used.

Fig. 2 is a partly sectional plan view of the said embodiment.

Fig. 3 is a sectional detail view showing a modification.

Fig. 4 is a side elevation of the said embodiment, showing the same differently applied.

Fig. 5 is a plan view thereof.

Having reference to the drawings,—

At 1, Figs. 1, 2, 4 and 5, is the seat proper, hereinafter termed specifically the seat. It is attached to an arm 2. The said arm, in turn, is hung to a stand or bracket 3. The said stand or bracket is constructed for attachment to a convenient support, it having the plate-portion 3ª to fit against the support, such plate-portion being formed with holes 3ᵇ, 3ᵇ, for the screws by which the attachment of the stand or bracket to the support is effected. The stand or bracket is recessed at one side, as shown in Fig. 2, to receive an enlarged hub 2ª of the arm 2, the arm being connected with the stand or bracket by means of a pivotal bolt 4. The stem of said bolt occupies holes formed in the hub-portion of the arm and in the body-portion of the stand or bracket centrally of the hub and recess, respectively. A nut 5 upon the screw-threaded portion of said bolt, at the back of the stand or bracket, keeps the bolt in place.

I may provide means for applying frictional resistance, or its equivalent, to the arm, to prevent too free a movement of the seat and arm. I may secure this frictional resistance by frictional interengagement in connection with the arm and stand or bracket. Thus, the contiguous lateral faces of the hub and recess are pressed with yielding force toward each other in the illustrated embodiments of the invention. The yielding pressure may be secured variously. In this instance it is secured by means of an expanding spiral spring 6, which surrounds the stem of the bolt 4 between the head of the latter and the outer surface of the hub-portion of the arm. Through adjustment of nut 5 upon bolt 4, by turning the said nut, the tension of the spring, and the degree of force with which the said contiguous faces of the hub and recess are pressed toward each other may be regulated. In Fig. 2 a washer 7 intervenes between the said faces, and is compressed between them. The said washer is composed of suitable frictional material, and the result of the frictional interengagement among the hub, washer, and stand or bracket is to restrain the arm and seat from too free movement. Consequently, when the arm and seat have been swung into a given position, they will remain therein until moved into a different position by the application of a degree of force sufficient to overcome the frictional resistance to such movement. Thereby accidental change of position of the seat when not occupied is prevented. The washer 7 may be omitted, if deemed best. The contiguous faces of the hub and stand or bracket may be waved or corrugated, with the waves or corrugations on one surface adapted to intermesh with those on the other, as shown in Fig. 3, if desired. In this latter instance the resistance to the turning of the arm and seat will be greater, and will necessitate the application of force sufficient to compress the spring 6 until one set of waves or corrugations can ride past the other set thereof.

A convenient stop is provided for the positive support of the arm and seat in their position of use while the weight of the user is sustained by the seat. In Figs. 1, 2, 4 and 5, a series of shoulders $3^c$, $3^c$, etc., in the form of ratchet-teeth is provided upon a flange $3^d$ of the stand or bracket, projecting from the latter at the side thereof at which the arm is located, and a dog or pawl 8 is pivoted by a screw 9 upon hub $2^a$. The said dog may be engaged with any one of the said shoulders or teeth. Through such engagement, the seat is locked and sustained in the required position for use. A pin $8^a$ projecting from the dog or pawl constitutes a handle therefor. By taking hold of such pin the dog or pawl may be swung by hand into or out of engagement with a tooth or shoulder. This construction permits the dog or pawl to be disengaged if necessary, and the arm and seat to be swung either up or down until the seat is at the required height, and then locked to retain the seat at such height by causing the dog or pawl to engage with the proper shoulder or tooth. A greater or less number of shoulders or teeth than that shown may be provided upon the stand or bracket in practice, and the said series will be formed upon the proper portion of the stand or bracket to coöperate with the dog or pawl when the seat and arm have been adjusted into the required position for use.

Figs. 4 and 5 show the stand or bracket disposed with the plate-portion uppermost and in a horizontal position, as when attached to the underside of a work-bench. Figs. 1 and 2 show the stand or bracket disposed with the plate-portion in a vertical position, as for attachment to an upright support.

If desired, the seat and arm may be swung upward from the positions occupied by them in full lines in Figs. 1 and 4 until the arm and seat extend upward above the stand or bracket, in which position they will be retained against accidental downward swinging movement through the lateral interengagement above described. Or the dog or pawl may be disengaged by hand from the shoulder or tooth with which it is shown engaged in either Fig. 1 or Fig. 4, (or from any other tooth with which it may be engaged in practice,) and the seat and arm may then be pushed down into a position pendent below the stand or bracket, as for instance in dotted lines in Fig. 4, in which position they will be retained by the lateral engagement aforesaid, without liability of accidental movement therefrom. In the dotted line position of Fig. 4 the seat and arm are entirely beneath the work-bench and quite out of the way. When the parts are mounted as in Figs. 1 and 2, the arm and seat will extend in a vertical or substantially vertical plane, adjacent the support to which the stand or bracket is attached. Thus, when seats embodying the invention are attached to suitable supports in connection with work-benches or machines, or adjacent the same, in shoe factories and the like, the seats may be swung back out of the way when not in use, in Figs. 4 and 5 entirely under the work-bench, thus leaving alleyways or pasageways clear, as required in many manufacturing establishments, and the seats are not likely to swing back accidentally into the way. Furthermore, seats constructed in conformity with the invention, and supported in connection with work-benches or machines as herein explained, take up less space in front of work-benches or machines than chairs or stools, thus lessening the necessary width of passageways or alleyways.

To enable the seat 1 to be adjusted upon the arm 2 so that its top surface may be brought into a horizontal plane in any position of the arm, or may be given any angle desired by the user of the seat, the seat has attached to its under side a bracket 10 formed with a transversely extending horizontal hole or socket, as indicated, and the arm 2 is provided with a lateral cylindrical extension $2^b$ which is inserted into the said hole or socket. The seat is capable of being turned into different angular positions around the said cylindrical extension, and after having been set is held in the required position by means of a clamping screw 11, Figs. 1 and 4, working in a threaded hole tapped in the lower portion of bracket 10 and biting by its inner end against the said extension. The seat may be adjusted transversely upon the lateral extension $2^b$ into either the position that is represented in Fig. 5 or that shown in Fig. 2. It will be observed that in Fig. 5 the seat is entirely at one side of the supporting arm 2, which permits a woman, for instance, to enter between the seat and the work-bench or machine and sit upon the seat, facing the bench or machine, without being inconvenienced by the supporting arm, and without having to straddle the latter.

In Fig. 2 the periphery of the hub $2^a$ of the arm, and a portion of the stand or bracket which encircles such periphery, are shown fitted to each other so that the said hub takes a peripheral bearing within the said encircling portion of the stand or bracket. This affords a better bearing-support for the seat and arm, and relieves the pivotal bolt from strain, and reduces the wear upon the said bolt and the portions of the hub and stand or bracket which make contact therewith. This peripheral bearing may be omitted, however, in some forms of the invention.

A special feature of the mode of mounting the seat which is illustrated in Figs. 1, 2, 4 and 5 is the fact that the location of the seat upon the lateral extension of the supporting arm, at one side of the latter and off-set with relation thereto, brings the elasticity of the seat arm into play through a species of torsional action, the arm constituting a kind of torsion spring, thereby rendering the seat more comfortable than it would be if it were unyieldingly mounted. An advantage gained by the seat-structure herein disclosed is that the seat 1 may be readily adjusted at any desired height above the floor, within the limits of the size and disposition of the seat-structure, to most comfortably serve the operative at a bench or machine, or in whatever other association it may be used. The necessity for this feature is very great in large establishments where the employees vary greatly in ages and sizes. Short persons will adjust the seat-arm 2 at an angle below the pivot, 6, Fig. 4, while others may adjust it horizontally or even above the pivot as shown in Fig. 1. This large range of adjustment makes it desirable that the seat 1 be readily adjustable upon the arm 2 to a suitable angle to compensate for the change of angle of the arm 2. To that end, the seat 1 may be adjusted on its pivotal arm 2$^b$ independently and irrespective of the angle of the arm 2 as to its pivot 6. This great range of adjustability of the seat therefore provides for the accommodation of operatives of different sizes, and for the individual requirements of operatives as to the angular disposition of the seat on the arm. The arrangement of the seat 1 entirely to one side of the plane of the arm 2 permits the seat to be turned pivotally on the lateral portion 2$^b$ of arm 2 without interference and to any desired angle.

What is claimed as the invention is,—

1. In combination, a seat-supporting arm having a lateral extension, a stand or bracket to which said arm is pivoted so that the seat and arm are capable of swinging in a vertical plane into position for use and into an idle retracted position, respectively, and a seat mounted in an offset relation to the arm upon said lateral extension of said arm, whereby the torsional elasticity of the arm is utilized, said stand or bracket having a stop shoulder which affords a positive support to the seat and arm when in position for use.

2. In combination, a seat-supporting arm having a laterally-offset seat-support and a hub-portion presenting a relatively large lateral bearing surface, a stand or bracket with which said hub-portion is pivotally engaged, said stand or bracket having a bearing surface corresponding to the bearing surface of the arm, said bearing surfaces coöperating with each other to restrain the arm from tipping transversely, a seat adapted to be fixedly arranged at different angles upon the said laterally-offset seat-support of the arm, and means for rigidly supporting the arm in the desired angular position of use.

In testimony whereof I affix my signature in presence of two witnesses.

VERTRUDE P. BUCK.

Witnesses:
 CHAS. F. RANDALL,
 EDITH A. WISEMAN.

Copies of this patent may be obtained for five cents each, by addressing the "Commissioner of Patents, Washington, D. C."